United States Patent
Ishikawa et al.

(10) Patent No.: US 9,377,117 B2
(45) Date of Patent: Jun. 28, 2016

(54) PRESSURE REDUCING VALVE

(71) Applicants: KEIHIN CORPORATION, Tokyo (JP); HONDA MOTOR CO., LTD., Tokyo (JP)

(72) Inventors: Kazuki Ishikawa, Utsunomiya (JP); Taneaki Miura, Saitama (JP); Koichi Takaku, Tochigi-ken (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 14/225,937

(22) Filed: Mar. 26, 2014

(65) Prior Publication Data

US 2014/0290758 A1    Oct. 2, 2014

(30) Foreign Application Priority Data

Mar. 27, 2013    (JP) ................................. 2013-065417

(51) Int. Cl.
  F16K 31/12    (2006.01)
  F16K 17/04    (2006.01)
  G05D 16/10    (2006.01)

(52) U.S. Cl.
  CPC ............. *F16K 17/044* (2013.01); *G05D 16/10* (2013.01); *Y10T 137/7738* (2015.04); *Y10T 137/7929* (2015.04)

(58) Field of Classification Search
  CPC  F16K 17/044; G05D 16/10; Y10T 137/7929; Y10T 137/7738; Y10T 137/7825; Y10T 137/7823; Y10T 137/7826
  See application file for complete search history.

(56) References Cited

U.S. PATENT DOCUMENTS

| | | | | |
|---|---|---|---|---|
| 3,856,043 A | * | 12/1974 | Feild | F04B 49/24 137/508 |
| 4,291,890 A | * | 9/1981 | Walker | F16J 15/166 277/587 |
| 4,556,227 A | * | 12/1985 | Sato | F16L 27/026 277/507 |
| 6,155,290 A | * | 12/2000 | Nakajima | G05D 16/0655 137/505.41 |
| 6,161,573 A | * | 12/2000 | Sheng | G05D 16/10 137/505.41 |
| 2003/0066562 A1 | * | 4/2003 | Wakeman | G05D 16/10 137/505 |
| 2008/0011365 A1 | * | 1/2008 | Newton | B05B 1/3013 137/540 |
| 2008/0047619 A1 | * | 2/2008 | Pechtold | G05D 16/10 137/505.41 |
| 2008/0302428 A1 | * | 12/2008 | Nomichi | F16K 31/1221 137/500 |
| 2009/0308465 A1 | * | 12/2009 | Suzuki | F16K 27/0254 137/317 |
| 2012/0090177 A1 | * | 4/2012 | Andueza | F16K 27/029 29/890.124 |

FOREIGN PATENT DOCUMENTS

EP    1031901 A1 *  8/2000  ............... F16K 1/42
JP    2010-237861    10/2010

* cited by examiner

*Primary Examiner* — Jessica Cahill
(74) *Attorney, Agent, or Firm* — Rankin, Hill & Clark LLP

(57) ABSTRACT

In a pressure reducing valve, a valve rod forms one portion of a side wall of a piston, and is connected to the piston inwardly of a sliding contact area, which is held in sliding contact with an inner wall of a body. More specifically, a connection location between the valve rod and the piston is located at the interior of the piston.

4 Claims, 4 Drawing Sheets

PRESSURE REDUCING VALVE

CROSS-REFERENCE TO RELATED APPLICATION

This application is based upon and claims the benefit of priority from Japanese Patent Application No. 2013-065417 filed on Mar. 27, 2013, the contents of which are incorporated herein by reference.

BACKGROUND OF THE INVENTION

1. Field of the Invention

The present invention relates to a pressure reducing valve, which includes a piston that is displaceable depending on a pressure in a decompression chamber.

2. Description of the Related Art

As well known in the art, pressure reducing valves function to reduce the pressure of a high-pressure fluid to a given pressure. The present applicant has proposed a diaphragm-type pressure reducing valve, as disclosed in Japanese Laid-Open Patent Publication No. 2010-237861.

With the diaphragm-type pressure reducing valve disclosed in Japanese Laid-Open Patent Publication No. 2010-237861, a valve rod and a diaphragm rod on which a diaphragm is supported are connected through a connecting shaft. The connecting shaft is displaced in a hollow interior portion of a guide member, and at this time, a side wall of the connecting shaft is held in sliding contact with an inner circumferential wall of the guide member. Moreover, as understood from FIG. 3 of Japanese Laid-Open Patent Publication No. 2010-237861, a connection location between the valve rod and the connecting shaft is disposed lower than a sliding contact area where the side wall of the connecting shaft is held in sliding contact with the inner circumferential wall of the guide member.

The valve rod is displaced in conjunction with the above-described displacement of the connecting shaft. The valve rod passes through a guide hole formed in another guide member separate from the aforementioned guide member. Therefore, when the valve rod is displaced, the side wall of the valve rod is held in sliding contact with the inner circumferential wall of the guide hole.

SUMMARY OF THE INVENTION

In the pressure reducing valve having the aforementioned structure, if tilting occurs in the valve rod, a portion of the circumferential side wall of the valve rod is pressed against the inner wall of the guide member. As a result, unbalanced loads are generated. In this case, since uneven wearing easily occurs in the valve rod, it is conceivable that the valve rod will suffer from a decrease in durability.

A general object of the present invention is to provide a pressure reducing valve in which the occurrence of tilting in a valve rod connected to a piston can be avoided as much as possible.

A principal object of the present invention is to provide a pressure reducing valve in which durability of the valve rod can be enhanced.

According to an embodiment of the present invention, there is provided a pressure reducing valve comprising a body including an ingress passageway for introducing a fluid, a valve chamber held in fluid communication with the ingress passageway, a valve seat disposed in the valve chamber, a valve element portion being selectively seated on and lifted off from the valve seat, a valve hole through which a valve rod with the valve element portion provided on the valve rod extends, a decompression chamber held in fluid communication with the valve chamber through the valve hole, and an egress passageway for delivering the fluid outside of the decompression chamber. The pressure reducing valve further comprises a piston housed in the body, the piston being coupled to the valve rod for displacement depending on a change in pressure of the fluid in the decompression chamber, a first resilient member for normally resiliently biasing the valve rod toward the valve seat, and a second resilient member for normally resiliently biasing the piston toward the valve seat. The valve rod is connected to the piston at the interior of the piston, and a connection location between the valve rod and the piston forms one portion of a side wall of the piston, the connection location is located inwardly of a sliding contact area, which is held in sliding contact with respect to an inner wall of the body, and the connection location is positioned at a center of the piston along a direction perpendicular with respect to a direction of displacement of the piston.

According to the present invention, since the connection location between the valve rod and the piston is provided in the foregoing manner, even if a force tending to tilt the piston is applied to the piston, the valve rod is not susceptible to such a force. Thus, the valve rod and the piston are less liable to be brought out of axial alignment with each other.

Accordingly, loading irregularities (loading eccentricity) caused by axial misalignment between the valve rod and the piston are prevented from being developed between the side wall of the valve rod and the inner circumferential wall of the guide hole through which the valve rod passes. As a result, the circumferential side wall surface of the valve rod is not subject to uneven wearing, so that the valve rod can exhibit a longer service life. Stated otherwise, the durability of the valve rod is enhanced.

The connection location between the valve rod and the piston preferably is positioned midway in a heightwise direction of the sliding contact area. In this case, the valve rod is made even less susceptible to forces tending to tilt the piston, and therefore, the valve rod and the piston are even less likely to fall out of axial alignment with each other. As a result, the durability of the valve rod is more greatly enhanced.

The aforementioned effect is particularly noticeable when the connection location between the valve rod and the piston is set at the center of gravity of the piston.

Furthermore, rings that are held in sliding contact with the inner wall of the body preferably are disposed on both ends in a direction of displacement of the sliding contact area. In this case, since the both ends in the direction of displacement of the sliding contact area of the piston are supported, tilting of the piston is unlikely to occur. Accordingly, the inner wall of the body being pressed by portions of the rings or the side wall of the piston (i.e., generation of unbalanced loads), and an increase in sliding resistance of the piston as a result thereof, can be avoided.

In addition, since the occurrence of uneven wear on the piston is avoided, the durability of the piston can be improved.

Further, when a seal member that is held in sliding contact elastically with the inner wall of the body is disposed in the sliding contact area, the seal member preferably is arranged at a position that passes through the center of gravity of the piston. In this case, the center of the seal member is positioned at the center of gravity of the piston, so that tilting of the piston is even more unlikely to occur.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A pressure reducing valve according to an embodiment of the present invention will be described in detail below with reference to the accompanying drawings. The terms "lower", "upper", "left", and "right" as well as other words representing directions will be used to indicate corresponding directions in FIG. 1. Moreover, the terms "lower end" and "upper end" as well as other phrases indicative of directions will be used to refer to objects positioned in such corresponding directions in FIG. 1.

Figure 1:
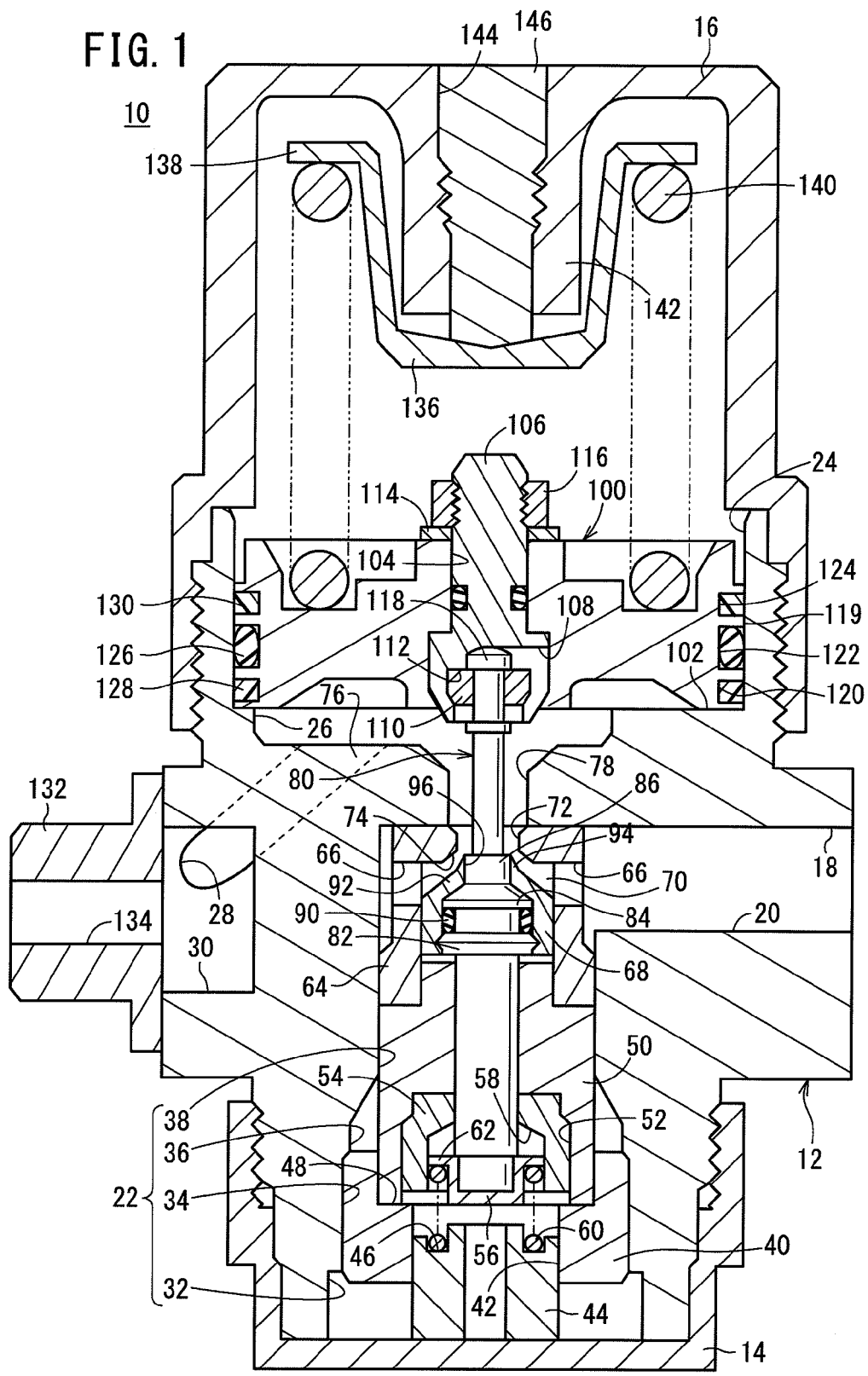
FIG. 1 is a longitudinal cross-sectional view of a pressure reducing valve according to an embodiment of the present invention, the pressure reducing valve being shown in an open state.

FIG. 1 is a longitudinal cross-sectional view of a pressure reducing valve 10 according to an embodiment of the present invention, the pressure reducing valve 10 being shown in an open state. As shown in FIG. 1, the pressure reducing valve 10 includes a body 12 that opens upwardly and downwardly, a lower cover 14 mounted on a lower end of the body 12, and an upper cover 16 mounted on an upper end of the body 12.

The body 12 has an inlet port 18 for introducing a fluid into the body 12, a housing hole 22 held in fluid communication with the inlet port 18 through an ingress passageway 20, a piston hole 24 that opens upwardly, an egress passageway 28 for delivering a fluid out of a later-described decompression chamber 26, and an outlet port 30 held in fluid communication with the egress passageway 28.

The housing hole 22 includes a large-diameter hole 32, which opens downwardly and is largest in terms of its inside diameter, a medium-diameter hole 34, which is smaller in diameter than the large-diameter hole 32 and has a constant diameter throughout its length, a tapered hole 36 that becomes progressively smaller in diameter in an upward direction, and a small-diameter hole 38 that is smallest in terms of the inside diameter thereof, which is constant throughout its length. The holes 32, 34, 36, 38 are successively arranged upwardly in this order. The lower cover 14 is threaded over the lower end of the body 12, thereby closing the large-diameter hole 32.

The medium-diameter hole 34 receives a first holder 40 fitted therein, which is substantially cylindrical in shape. The first holder 40 has an insertion hole 42 extending upwardly and defined substantially radially centrally therethrough. A collar 44 is inserted axially and displaceably in the insertion hole 42. The collar 44 is pressed upwardly by the lower cover 14, thereby preventing removal of the collar 44 from the insertion hole 42. The collar 44 has an annular recess 46 defined in an upper end surface thereof.

The insertion hole 42 includes a step 48, which engages with the lower end of a second holder 50 for locking the holder 50. The second holder 50 has an outer circumferential wall surface, including an upper portion that is held in abutment against (contact with) an inner circumferential wall surface of the small-diameter hole 38.

The second holder 50 has a first insertion hole 52 defined axially therethrough, which is reduced in diameter stepwise in an upward direction. A retainer holder 54 and a first retainer 56 are retained in a lower wider portion of the first insertion hole 52. The retainer holder 54 is of a cup-like shape, having a second insertion hole 58 defined therein, which becomes progressively smaller in diameter in the upward direction. The first retainer 56 is press-fitted in a wider lower constant-diameter portion of the second insertion hole 58.

A first helical spring (first resilient member) 60 is interposed between the collar 44 and the first retainer 56. The first retainer 56 has a flange 62, which projects radially outward from an upper end thereof. The first helical spring 60 has a lower end, which is seated on the bottom surface of the annular recess 46 defined in the collar 44, and an upper end, which is seated on the lower end surface of the flange 62 of the first retainer 56.

The small-diameter hole 38 also receives a guide 64, which is of a substantially cylindrical hollow shape. The guide 64 has plural radial passage holes 66 defined therein, which extend from an outer circumferential wall surface toward an inner circumferential wall surface thereof. A fluid, which is introduced from the inlet port 18, flows into the small-diameter hole 38 (housing hole 22), whereupon the fluid flows through the passage holes 66 into the guide 64. More specifically, the fluid flows into a valve chamber 70, which is defined between an outer wall surface of a later-described valve element 68 (valve element portion) and an inner wall surface of the guide 64.

The guide 64 has a valve hole 72 defined axially through an upper wall thereof. The valve hole 72 has a lower opening proximate the valve chamber 70. The lower opening of the valve hole 72 is defined by a tapered surface, which becomes progressively reduced in diameter in the upward direction. The tapered surface that defines the lower opening of the valve hole 72 serves as a valve seat 74 on which the valve element 68 can be seated and from which the valve element 68 can be separated.

The body 12 has an annular division wall 76 that projects radially inward to thereby separate the housing hole 22 and the piston hole 24 from each other. The division wall 76 has a passage hole 78 defined therein through which the housing hole 22 and the piston hole 24 are held in fluid communication with each other. The guide 64 has an upper end surface, which is held in abutment against (contact with) the lower end surface of the division wall 76.

An elongate valve rod 80 extends through the first insertion hole 52, the second insertion hole 58, the valve hole 72, and the passage hole 78. A lower end of the valve rod 80 is supported by the first retainer 56. The valve rod 80 is normally resiliently biased upwardly toward the valve seat 74 by the first helical spring 60, which is seated on the flange 62 of the first retainer 56.

When the lower cover 14 is turned in a direction so as to be mounted on the body 12, the collar 44 is displaced upwardly in the insertion hole 42, thereby compressing the first helical spring 60. Conversely, when the lower cover 14 is turned in a direction to be removed from the body 12, the collar 44 is displaced downwardly in the insertion hole 42, thereby expanding the first helical spring 60. Accordingly, the resilient biasing force that the first helical spring 60 applies to the valve rod 80 can be adjusted by changing the degree to which the first helical spring 60 is compressed or expanded.

Figure 2:
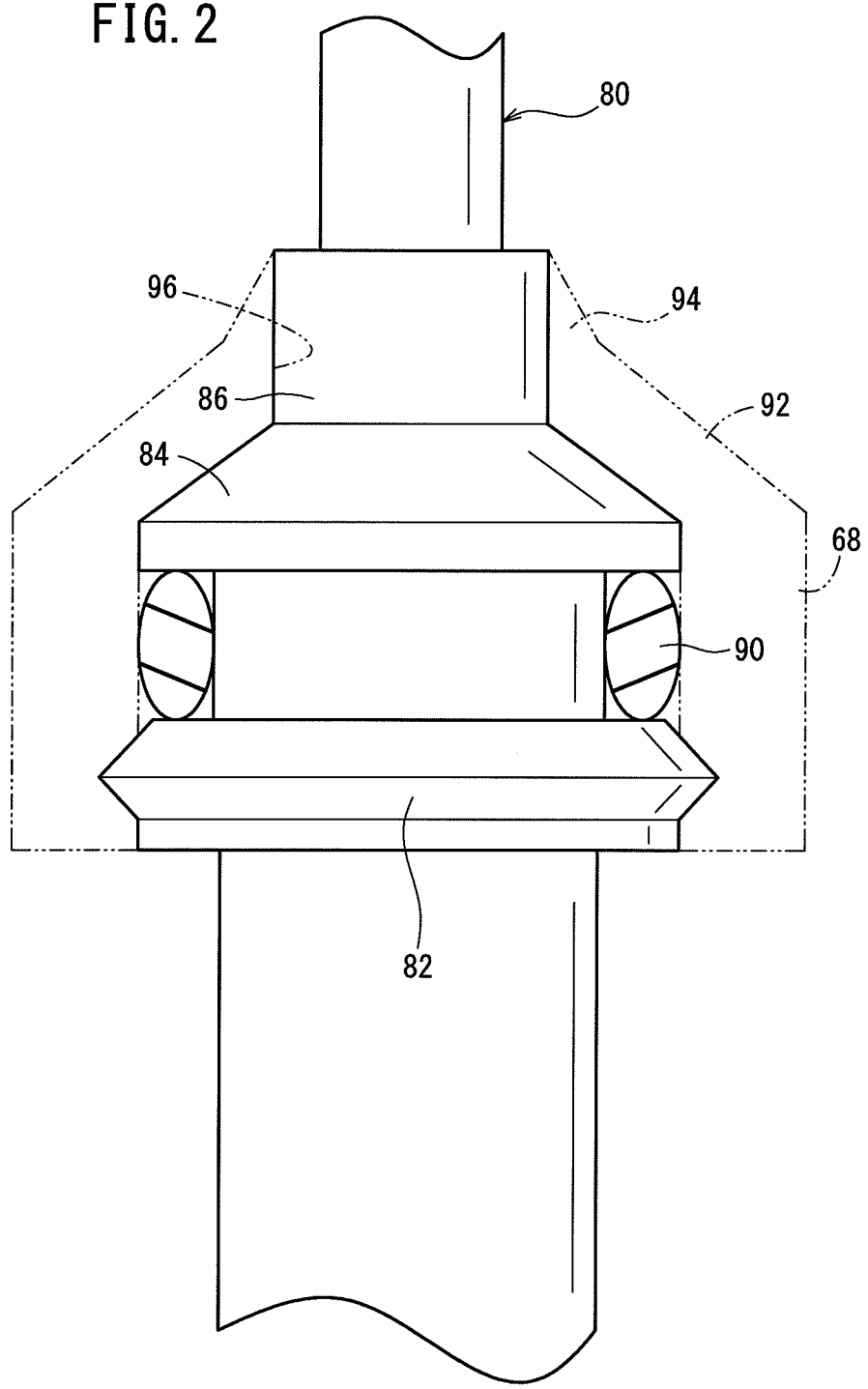
FIG. 2 is an enlarged front elevational view of a valve rod of the pressure reducing valve shown in FIG. 1.

The valve rod 80 includes a thin large-diameter ridge 82, which projects radially outward from a substantially vertical intermediate portion thereof. The valve rod 80 also includes a dish-shaped disk 84, which is slightly spaced upwardly from the large-diameter ridge 82, and which is tapered or becomes progressively smaller in diameter in an upward direction, and a constant-diameter portion 86, which extends upwardly from the upper end of the dish-shaped disk 84. As shown at an enlarged scale in FIG. 2, an annular seal ring 90 is mounted on a small-diameter portion of the valve rod 80 between the large-diameter ridge 82 and the dish-shaped disk 84.

The valve element 68, which serves as a valve element portion, is fitted over the valve rod 80 and extends in an axial direction from the large-diameter ridge 82 to the constant-diameter portion 86. When the valve rod 80 is displaced axially and longitudinally, the valve element 68 is displaced in unison with the valve rod 80. The seal ring 90 is interposed between the valve element 68 and the valve rod 80.

On the upper end of the valve element 68, a reduced-diameter portion 92 is provided that tapers gradually upwardly complementary in shape to the tapered valve seat 74, and an annular projection 94 is provided that projects in an axial direction from the small-diameter upper end of the reduced-diameter portion 92. When the valve element 68 is displaced upwardly, the reduced-diameter portion 92 is seated on the valve seat 74 (see FIG. 4), thereby closing the valve seat 74 and the valve hole 72. At this time, the annular projection 94 enters into the valve hole 72.

The constant-diameter portion 86 of the valve rod 80 engages in an engaging hole 96, which is defined in the annular projection 94.

As shown in FIG. 1, a substantially disk-shaped piston 100 is disposed in the piston hole 24. The piston hole 24 is defined by an inner circumferential wall surface including a radial inwardly projecting annular stopper 102. A lower stroke end of the piston 100 is reached when the piston undergoes downward displacement and is stopped by the annular stopper 102.

When the piston 100 is positioned at its lower stroke end, the passage hole 78 and the lower end surface of the piston 100 jointly define a clearance therebetween. The clearance serves as the decompression chamber 26. When the valve hole 72 is open, since the valve hole 72 and the passage hole 78 are held in fluid communication with each other, fluid communication is maintained between the decompression chamber 26 and the valve chamber 70 through the valve hole 72 and the passage hole 78. An end of the egress passageway 28 opens into the decompression chamber 26.

The piston 100 has an engaging hole 104, which is defined substantially centrally therein in a diametrical direction and extends axially through the piston 100 along a thicknesswise direction thereof. An engaging member 106 engages in the engaging hole 104 and locks the upper end of the valve rod 80 in place. More specifically, the engaging member 106 has an insertion chamber 108 defined in the lower end thereof, and an upper end portion of the valve rod 80 is inserted in the insertion chamber 108. Further, a C-shaped clip 110 is fitted over the upper end portion of the valve rod 80. The C-shaped clip 110 engages in an engaging groove 112, which is defined in an inner wall surface of the insertion chamber 108. The C-shaped clip 110 serves to couple the valve rod 80 and the engaging member 106 to each other.

The engaging member 106 further has an upper end that projects outside of the engaging hole 104. A nut 116 is threaded over the projecting upper end of the engaging member 106, with a washer 114 interposed between the nut 116 and the piston 100. The nut 116, which is threaded in this manner over the projecting upper end of the engaging member 106, prevents the engaging member 106 from being removed from the engaging hole 104. The piston 100 is sandwiched between the nut 116 and a wider lower end portion of the engaging member 106. Consequently, the valve rod 80 is rigidly coupled to the piston 100 by the engaging member 106.

When the valve rod 80 is coupled to the piston 100, a wider upper end surface 118 of the valve rod 80 is held in contact with an upper surface of the insertion chamber 108, and is positioned at a substantially intermediate location in the piston 100 along the thicknesswise direction thereof in a substantially central position in the diametrical direction of the piston 100. Therefore, the valve rod 80 has an upper end portion extending up to the center of the piston 100.

According to the present embodiment, the center of the piston 100 is aligned with the center of gravity of the piston 100. Consequently, the upper end of the valve rod 80 also is positioned at the center of gravity of the piston 100.

The piston 100 has a side circumferential wall surface including a sliding contact area 119, which is held in sliding contact with the inner wall surface of the piston hole 24. The sliding contact area 119 includes a first annular groove 120, a second annular groove 122, and a third annular groove 124 defined therein, which are successively arranged upwardly in this order and are slightly spaced axially from each other. The first annular groove 120 and the third annular groove 124 are positioned respectively at lower and upper ends of the sliding contact area 119.

Figure 3:
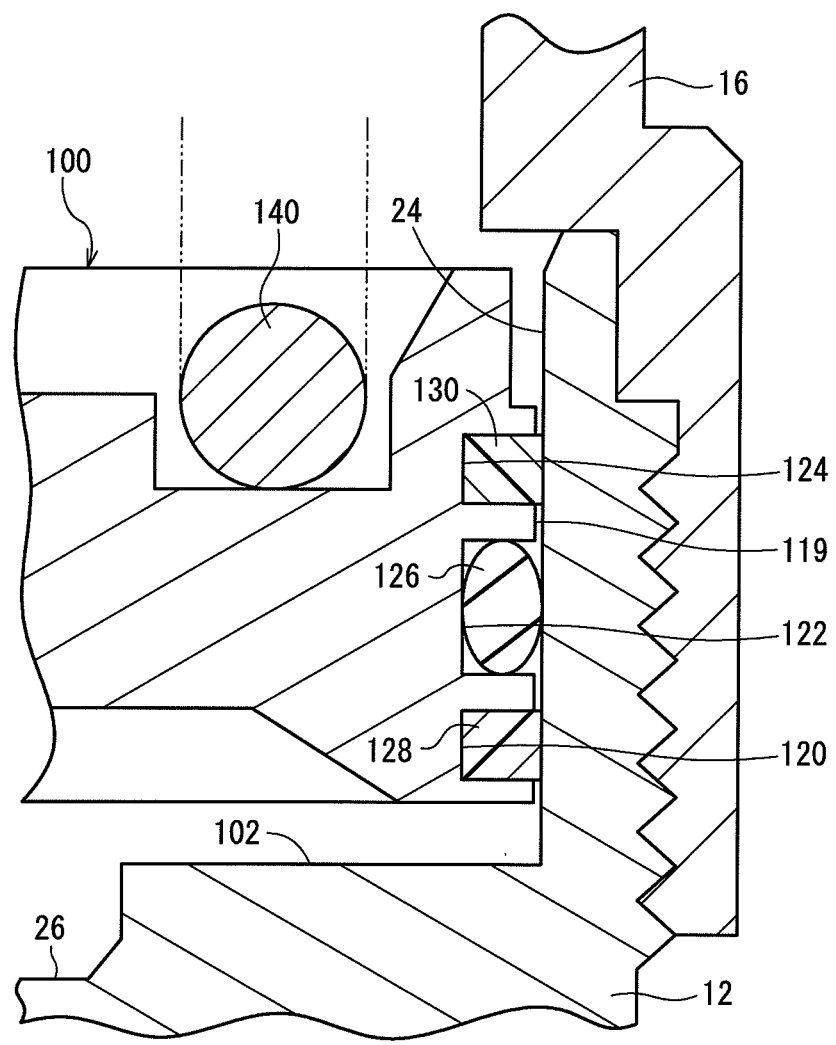
FIG. 3 is an enlarged fragmentary longitudinal cross-sectional view of a piston of the pressure reducing valve shown in FIG. 1.

As shown in FIGS. 1 and 3, an o-ring 126, which serves as a seal member, is housed in the second annular groove 122. A first ring 128 and a second ring 130 are housed respectively in the first annular groove 120 and the third annular groove 124. The o-ring 126 is disposed between the first ring 128 and the second ring 130, and is spaced from the first ring 128 and the second ring 130. The first ring 128 and the second ring 130 are positioned respectively at lower and upper ends of the sliding contact area 119.

Outer circumferential surfaces of the first ring 128, the o-ring 126, and the second ring 130 project slightly from the first annular groove 120, the second annular groove 122, and the third annular groove 124, respectively, and are held in sliding contact against the inner wall surface of the piston hole 24 upon displacement of the piston 100 (see FIG. 3).

The wider upper end surface 118 of the valve rod 80 is located at a vertical position, which is substantially in alignment with the vertical position of the o-ring 126. Therefore, the upper end of the valve rod 80 is positioned radially inward of the sliding contact area 119. According to the present embodiment, the point at which the valve rod 80 and the engaging member 106 are held in contact with each other, i.e., the point at which the valve rod 80 and the piston 100 are coupled to each other, is located at the center of gravity of the piston 100 and is positioned radially inward of the sliding contact area 119. The o-ring 126 is mounted in the second annular groove 122 with the center thereof aligned with the center of gravity of the piston 100.

The o-ring 126 primarily provides a seal between the side wall surface (sliding contact area 119) of the piston 100 and the inner circumferential wall surface of the piston hole 24. Additionally, the first ring 128 and the second ring 130 perform a sealing function.

The o-ring 126 is made of a resilient material such as synthetic rubber. Therefore, the o-ring 126 is resiliently held in sliding contact against the inner circumferential wall surface of the piston hole 24. The first ring 128 and the second ring 130 are made of a resin that has a smaller coefficient of friction than the o-ring 126.

The synthetic rubber and the resin referred to above are not limited to any particular combination of materials, insofar as such materials have coefficients of friction related to each other in the above-described manner. If the o-ring 126 is made of urethane rubber, then the first ring 128 and the second ring 130 may be made of polytetrafluoroethylene resin or polyetheretherketone resin, for example. The first ring 128 and the second ring 130, which are made of a resin material having a small coefficient of friction, are effective to avoid subjecting the piston 100 to increased sliding resistance during displacement thereof.

A gas outlet coupling 132 is coupled to the body 12 over the outlet port 30. Gas that has reached the outlet port 30 through the decompression chamber 26 and the egress passageway 28 flows through an outlet passageway 134 that is defined in the gas outlet coupling 132, and then flows outside of the pressure reducing valve 10.

As shown in FIG. 1, the piston hole 24 is closed by the hollow upper cover 16, which is threaded over the body 12. The upper cover 16 houses therein a second helical spring (second resilient member) 140. A lower end of the second helical spring 140 is seated on the piston 100, and an upper end thereof is seated on a flange 138 of a second retainer 136. The piston 100 is normally biased resiliently by the second helical spring 140 toward the valve seat 74.

The upper cover 16 has a cylindrical boss 142 that extends downward from the upper end wall thereof. An adjustment hole 144 is defined longitudinally through the cylindrical boss 142. An adjustment screw 146 is threadably inserted in the adjustment hole 144. When the adjustment screw 146 is threaded or turned, the vertical position of the second retainer 136 is changed, thereby changing the degree to which the second helical spring 140 is compressed or expanded. As a result, the resilient biasing force that is applied to the piston 100 from the second helical spring 140 can be adjusted.

The pressure reducing valve 10 according to the present embodiment basically is constructed as described above. Advantages of the pressure reducing valve 10 will be described below in relation to operations of the pressure reducing valve 10.

The pressure reducing valve 10 is incorporated in a distribution line for a reactant gas, such as a hydrogen-containing gas, for example, that is used to operate a fuel cell. The distribution line may be a supply line for supplying a reactant gas to the fuel cell, or a discharge line for discharging a reactant gas from the fuel cell.

It is assumed that the fluid handled by the pressure reducing valve 10 is a reactant gas. Such a reactant gas is introduced from the inlet port 18 into the ingress passageway 20, and then flows into the housing hole 22 (the small-diameter hole 38). The reactant gas flows through the passage holes 66 in the guide 64 and into the guide 64, i.e., into the valve chamber 70. When the valve rod 80 is in the initial position shown in FIG. 1, with the valve element 68 lifted off from the valve seat 74, the reactant gas flows from the valve chamber 70, through the valve hole 72 and the passage hole 78, and into the decompression chamber 26.

If the reactant gas in the decompression chamber 26 is kept under a predetermined pressure or lower, and the sum of the pressing force applied to the piston 100 from the reactant gas and the resilient biasing force applied to the valve rod 80 from the first helical spring 60 through the first retainer 56 is smaller than the resilient biasing force applied to the piston 100 from the second helical spring 140, then the piston 100 is not displaced. In this case, the reactant gas flows from the decompression chamber 26, into the egress passageway 28, and then to the outlet port 30, from which the reactant gas flows through the outlet passageway 134 in the gas outlet coupling 132 and outside of the pressure reducing valve 10.

If the pressure of the reactant gas in the decompression chamber 26 is sufficiently high, and the sum of the pressing force applied to the piston 100 from the reactant gas in the decompression chamber 26 and the resilient biasing force applied to the valve rod 80 from the first helical spring 60 through the first retainer 56 is greater than the resilient biasing force applied to the piston 100 from the second helical spring 140, then the piston 100 is displaced upwardly. Since the valve rod 80 is coupled to the piston 100 through the engaging member 106, the valve rod 80 also is displaced upwardly in unison with the piston 100. At this time, the side circumferential wall surface of the valve rod 80 primarily is held in sliding contact with the inner circumferential wall surface of the second insertion hole 58. Further, the second helical spring 140 is contracted, whereas the first helical spring 60 is expanded.

Figure 4:
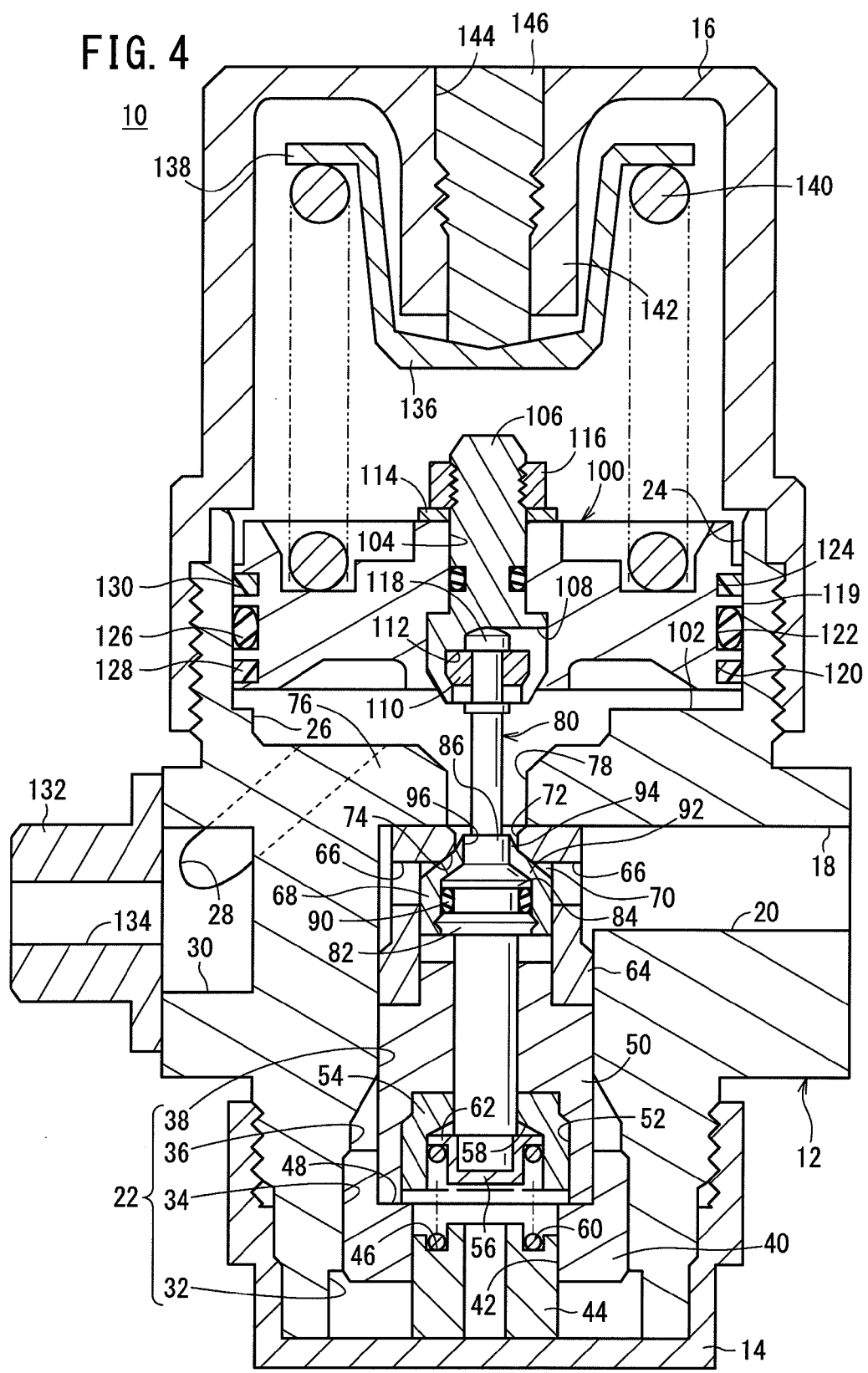
FIG. 4 is a longitudinal cross-sectional view of the pressure reducing valve shown in FIG. 1, the pressure reducing valve being shown in a closed state.

As a result, as shown in FIG. 4, the reduced-diameter portion 92 of the valve element 68, which is fitted over the valve rod 80, is seated on the valve seat 74, thereby closing the valve seat 74. At this time, the valve chamber 70 and the decompression chamber 26 become disconnected from each other, thereby closing the pressure reducing valve 10. The reactant gas, which is discharged outside of the pressure reducing valve 10, is simply the reactant gas that already has entered the decompression chamber 26 prior to closing the pressure reducing valve 10. Further, the annular projection 94 of the valve element 68 enters into the valve hole 72.

When the reactant gas, which has entered the decompression chamber 26, flows through the egress passageway 28, the outlet port 30 and the outlet passageway 134 and is discharged outside of the pressure reducing valve 10, the pressure in the decompression chamber 26, i.e., the pressing force applied to the piston 100 from the reactant gas in the decompression chamber 26, is lowered. When the resilient biasing force of the second helical spring 140 overcomes the sum of the pressing force applied to the piston 100 from the reactant gas in the decompression chamber 26 and the resilient biasing force applied to the valve rod 80 from the first helical spring 60, the piston 100 is displaced downwardly. The valve rod 80, which is coupled to the piston 100, also is displaced downwardly. At this time, the second helical spring 140 is expanded and the first helical spring 60 is contracted.

The reduced-diameter portion 92 of the valve element 68 is lifted off from the valve seat 74 and returns to the position shown in FIG. 1. Further, fluid communication between the valve chamber 70 and the decompression chamber 26 is restored, thereby opening the pressure reducing valve 10.

The above operation cycle is repeated, as necessary, in order to discharge the reactant gas, which is kept under high pressure in the ingress passageway 20, from the egress passageway 28 under a reduced pressure. In other words, the pressure of the reactant gas, which is high before entering into the pressure reducing valve 10, is reduced when the reactant gas flows through the pressure reducing valve 10.

While the piston 100 is displaced repeatedly in the foregoing manner, the sliding contact area 119 continuously slidingly contacts with the inner circumferential wall surface of the piston hole 24. Therefore, at least one of the side circumferential wall surface of the sliding contact area 119 and the inner circumferential wall surface of the piston hole 24 is subjected to wear, and then abrasion debris may possibly be produced.

According to the present embodiment, the first ring 128 and the second ring 130, which are disposed on respective sides of the o-ring 126, are embedded in the sliding contact area 119 of the side wall surface of the piston 100. The first ring 128 and the second ring 130 are positioned upstream or downstream of the o-ring 126 with respect to the direction in which the piston 100 is currently being displaced.

For example, during upward displacement of the piston 100, when abrasion debris is produced above or downstream of the second ring 130, the abrasion debris is cleared off by the second ring 130. Conversely, during downward displacement of the piston 100, when abrasion debris is produced below or downstream of the first ring 128, the abrasion debris is cleared off by the first ring 128.

The first ring 128 and the second ring 130 are made of a resin material, which is more rigid and less elastically deformable than rubber. Therefore, when the first ring 128 and the second ring 130 come into contact with abrasion debris, it is difficult for the first ring 128 and the second ring 130 to become elastically deformed and to ride over the abrasion debris. Stated otherwise, it is difficult for the abrasion debris to move past the first ring 128 or the second ring 130.

More specifically, the abrasion debris is blocked by the first ring 128 or the second ring 130 and is prevented from reaching the o-ring 126. Therefore, upon displacement of the piston 100, abrasion debris is prevented from entering between the o-ring 126 and the inner wall surface of the piston hole 24 and damaging the o-ring 126. Consequently, the sealing capability of the o-ring 126 is prevented from being lowered.

In addition, since the first ring 128 and the second ring 130 are disposed respectively at lower and upper ends of the sliding contact area 119, and are held in contact with the inner circumferential wall surface of the piston hole 24, gaps are prevented from being formed between the inner circumferential wall surface of the piston hole 24 and the upper and lower ends of the sliding contact area 119 of the piston 100. Accordingly, since the piston 100 is prevented from being tilted, portions of the first ring 128, the second ring 130, or the sliding contact area 119 are prevented from becoming unnecessarily close to and pressing against the inner circumferential wall surface of the piston hole 24. Thus, sliding resistance, which the piston 100 is subjected to, is prevented from increasing.

Inasmuch as the first ring 128 and the second ring 130 are made of a resin material having a small coefficient of friction, preferably polytetrafluoroethylene resin, polyetheretherketone resin, or the like, the first ring 128 and the second ring 130 exhibit sufficiently small frictional resistance. Consequently, sliding resistance that the piston 100 is subjected to is prevented from increasing, thereby ensuring a suitable speed at which the piston 100 is displaced in response to the pressing force from the reactant gas. Therefore, the speed at which the pressure reducing valve 10 is displaced, i.e., the responsivity of the pressure reducing valve 10, also is ensured.

The first ring 128 and the second ring 130, which have a small coefficient of friction, also function as a guide for guiding the piston 100 upon displacement of the piston 100. More specifically, the first ring 128 and the second ring 130 increase lubricity, thereby making it easy for the piston 100 to be displaced.

Furthermore, since the first ring 128 and the second ring 130 double as seal members, the first ring 128 and the second ring 130 provide an increased sealing capability between the side wall surface (the sliding contact area 119) of the piston 100 and the inner wall surface of the piston hole 24, while at the same time preventing sliding resistance from increasing.

Upon repeated displacement of the piston 100, the circumferential side wall surface of the valve rod 80 is held continuously in sliding contact with the inner circumferential wall surface of the second insertion hole 58.

As described above, the point at which the valve rod 80 and the engaging member 106 are held in contact with each other, i.e., the point at which the valve rod 80 and the piston 100 are coupled to each other, is located at the center of the piston 100. Stated otherwise, this point is positioned radially inward of the sliding contact area 119 along a direction perpendicular to the direction in which the piston 100 is displaced. Consequently, even if a force tending to tilt the piston 100 is applied to the piston 100, the valve rod 80 is not susceptible to such a force. Thus, the valve rod 80 and the piston 100 are less liable to be brought out of axial alignment with each other. Further, since the point at which the valve rod 80 and the piston 100 are held in contact with each other is located at the center of gravity of the piston 100, the valve rod 80 and the piston 100 are less liable to fall out of axial alignment with each other, even if the piston 100 is tilted in the piston hole 24.

Accordingly, loading irregularities (loading eccentricity) due to axial misalignment between the valve rod 80 and the piston 100 are prevented from being developed between the circumferential side wall surface of the valve rod 80 and the inner circumferential wall surface of the second insertion hole 58. The circumferential side wall surface of the valve rod 80 is not subject to uneven wearing, so that the valve rod 80 can exhibit a longer service life and increased durability.

According to the present embodiment, as described above, the first ring 128 and the second ring 130 are disposed respectively at lower and upper ends of the sliding contact area 119, and the center of the o-ring 126 is aligned with the center of gravity of the piston 100. Therefore, the piston 100 is not liable to be tilted. Such a feature is effective to sufficiently prevent the valve rod 80 and the piston 100 from falling out of axial alignment with each other. As a result, the durability of the valve rod 80 can be further increased.

The present invention is not limited to the above embodiment. Various changes and modifications may be made to the embodiment without departing from the scope of the invention.

For example, instead of the valve element 68, a valve element portion that is formed integrally with the valve rod 80, i.e., as a unitary member together with the valve rod 80, may be adopted.

Further, the piston is not particularly limited to the structure of the aforementioned disk-shaped piston 100, and may be a polygonal-shaped body such as a rectangular shape or the like. In the case as well, the connection location between the valve rod 80 and the piston (or the engaging member 106) may be set inwardly of the sliding contact area of the piston. Further, in this case, the center of the polygonal-shaped body can be determined as the intersection of a plurality of diagonal lines.

A gas or a liquid other than the aforementioned reactant gas may be handled as a fluid by the pressure reducing valve 10.

What is claimed is:

1. A pressure reducing valve comprising:
   a body including an ingress passageway for introducing a fluid, a valve chamber held in fluid communication with the ingress passageway, a valve seat disposed in the valve chamber, a valve element portion being selectively seated on and lifted off from the valve seat, a valve hole through which a valve rod with the valve element portion provided on the valve rod extends, a decompression chamber held in fluid communication with the valve chamber through the valve hole, and an egress passageway for delivering the fluid outside of the decompression chamber;

a piston housed in the body, the piston being coupled to the valve rod for displacement depending on a change in pressure of the fluid in the decompression chamber;

a first resilient member for normally resiliently biasing the valve rod toward the valve seat; and a second resilient member for normally resiliently biasing the piston toward the valve seat, wherein the valve rod is connected to the piston at an interior of the piston, the valve rod and the piston are connected such that the valve rod and the piston are tiltable with respect to each other, and a connection location between the valve rod and the piston forms one portion of a side wall of the piston, the connection location is located inwardly of a sliding contact area, which is held in sliding contact with respect to an inner wall of the body, and the connection location between the valve rod and the piston is positioned at a center of gravity of the piston and at a center of the piston along a direction perpendicular with respect to a direction of displacement of the piston.

2. The pressure reducing valve according to claim 1, wherein the connection location between the valve rod and the piston is positioned midway in a heightwise direction of the sliding contact area.

3. The pressure reducing valve according to claim 1, wherein rings, which are held in sliding contact with the inner wall of the body, are disposed on both ends of the sliding contact area in a direction of displacement of the sliding contact area, the sliding contact area forming a part of the side wall of the piston.

4. The pressure reducing valve according to claim 1, wherein:

a seal member, which is held in sliding contact elastically with the inner wall of the body, is disposed in the sliding contact area; and the seal member is arranged at a position that passes through a center of gravity of the piston.

* * * * *